Figures 1, 2:
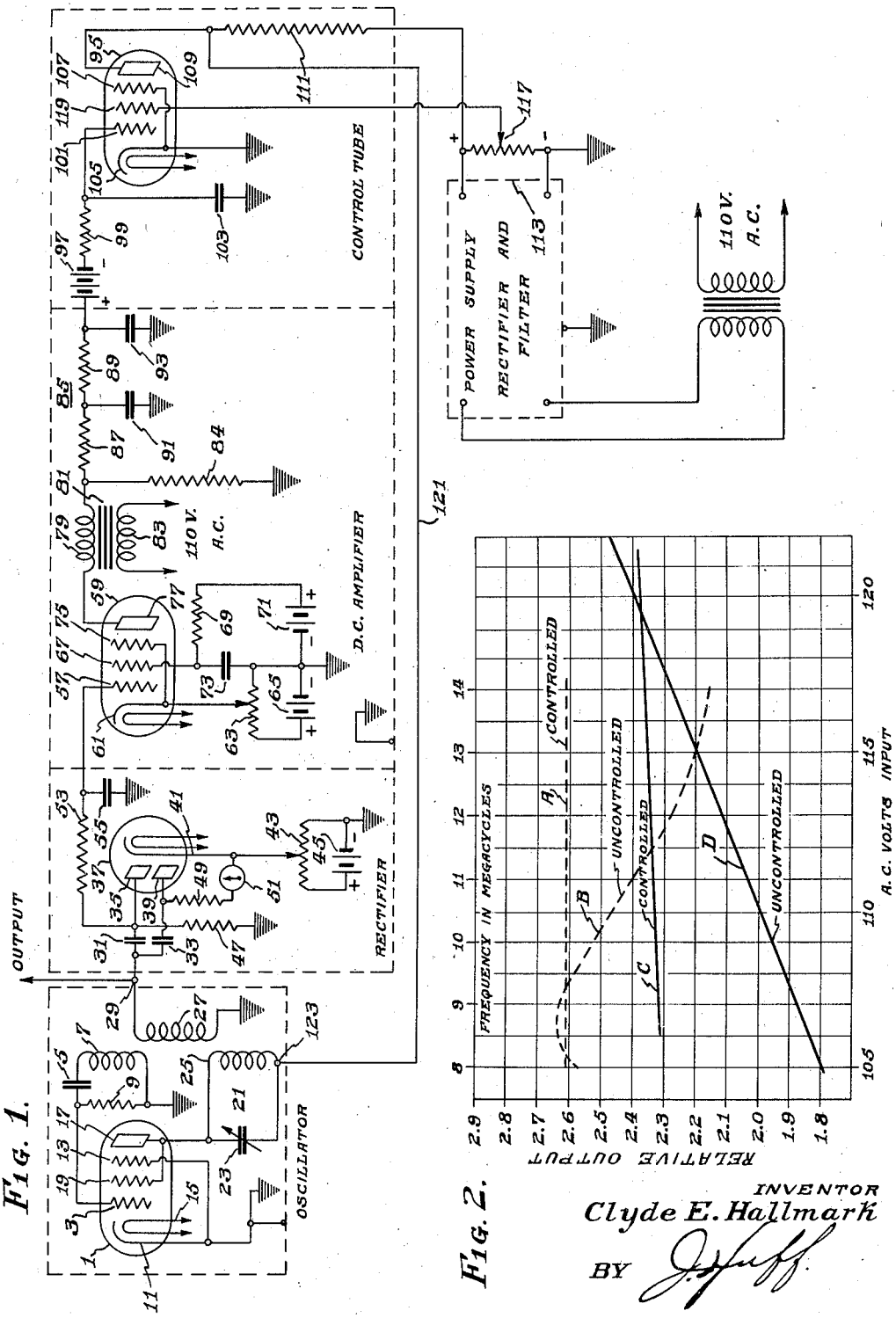

Dec. 28, 1937.  C. E. HALLMARK  2,103,619
CONSTANT VOLTAGE GENERATOR
Filed Jan. 31, 1936

INVENTOR
Clyde E. Hallmark
BY
ATTORNEY

Patented Dec. 28, 1937

2,103,619

UNITED STATES PATENT OFFICE 2,103,619

CONSTANT VOLTAGE GENERATOR

Clyde E. Hallmark, Camden, N. J., assignor to Radio Corporation of America, a corporation of Delaware Application January 31, 1936, Serial No. 61,669

7 Claims. (Cl. 250—36)

My invention relates to thermionic oscillators. Specifically, my invention is a thermionic oscillator in which constant output voltages are generated by automatically compensating for variations of output by adjusting the voltage applied to the oscillator anode.

I am aware of the development of thermionic oscillators which have fairly constant output voltages throughout a range of frequencies. These oscillators have compound feedback coupling means which tend to give constant output over a range of oscillatory frequencies. In general such oscillators do not generate output voltages which are independent of voltages applied to anode. Some thermionic oscillator circuits employ voltage regulation for the anode circuits but nevertheless do not have output voltages which are independent of frequency.

One of the objects of my invention lies in a thermionic oscillator which generates a substantially constant output voltage from a source of alternating current which is subject to fluctuations.

Another object of my invention is the provision of means for generating oscillatory voltages which are substantially constant irrespective of variations in frequency.

A further object is to generate high radio frequency voltages which are kept constant by automatically compensating for variations of anode voltage.

An additional object is to generate a constant direct current from an alternating current source which is subject to variation.

In the accompanying drawing, Figure 1 is a schematic circuit diagram illustrating an embodiment of my invention, and Fig. 2 represents in graphic form the operation of a thermionic oscillator with and without automatic voltage control.

In Fig. 1 a thermionic tube 1 is connected as follows: The control grid 3 is connected through a grid capacitor 5 to a grid circuit inductor 7. The grid is grounded through a grid leak resistor 9. The cathode 11 is connected to a suppressor grid 13. The cathode and suppressor grid are grounded. A heater 15 is connected to a suitable power supply. This connection, as well as other heater connections, have been omitted in this diagram to avoid unnecessary complications.

The anode 17 of tube 1 is connected to the grid 19 and to the tunable tank circuit 21. This tank circuit is comprised of a variable capacitor 23 and an inductor 25 which may be coupled to the grid circuit inductor 7. A pickup inductor 27 is inductively coupled to the grid and tank circuits. One terminal of the pickup inductor 27 is grounded. The other terminal 29 is connected to the output or work circuit of the oscillator.

The high potential terminal 29 of the pickup inductor 27 is connected to a pair of coupling capacitors 31, 33. One of these capacitors 31 is coupled to the anode 35 of a diode rectifier 37. The other capacitor 33 is coupled to the other anode 39 of the rectifier. The cathode 41 of the rectifier 37 is connected to the slider of potentiometer 43. A biasing battery 45 is connected across the potentiometer. The negative terminal of the biasing battery is grounded.

A load resistor 47 is connected to the junction of the capacitor 31 and anode 35 and to ground. A second load resistor 49 is connected to the junction of the capacitor 33 and anode 39 and to a microammeter 51 which is connected to the cathode 41. The anode 35 is connected through a filter network, comprising a series resistor 53 and a shunt capacitor 55, to the control grid 57 of a thermionic tube 59.

A thermionic tube 59 is connected as a direct current amplifier. The cathode 61 of this tube is connected to the slider of a potentiometer 63. A biasing battery 65 is shunted across the potentiometer. The negative terminal of the biasing battery is grounded. A screen grid 67 is connected through a filter resistor 69 to the positive terminal of a battery 71. The negative terminal of this battery is grounded. A capacitor 73 is connected between screen grid 67 and ground.

A suppressor grid 75 is joined to the cathode 61. The anode 77 of the direct current amplifier tube is connected to the secondary 79 of a transformer 81. The primary 83 of this transformer is connected to a 110 volt A. C. power supply, whereby a potential of the order of several hundred volts may be applied between anode 77 and cathode 61. The terminal of the secondary 79, remote from the anode 77, is connected to ground through a resistor 84. This same terminal is connected to a filter network 85. This network comprises series resistors 87, 89 and shunt capacitors 91, 93.

The output of the filter network is connected to the input of a thermionic control tube 95. The positive terminal of a biasing battery 97 is connected to the high potential output terminal of the filter network 85. The negative terminal of the biasing battery is connected through a filter resistor 99 to the control grid 101 of control tube 95. The grid 101 is connected through a bypass capacitor 103 to ground. The cathode 105 is connected to suppressor grid 107 and to ground.

The anode 109 of the control tube 95 is connected through a resistor 111 to the positive terminal of a power supply. This power supply may consist of rectified and filtered alternating current. Since rectifier and filter networks are well known to those skilled in the art, a detailed description of the power supply may be omitted. A potentiometer is shunted across the power supply 113. A connection 117, intermediate the ends of the potentiometer, supplies the proper positive potential for the screen grid 119. The anode supply for the oscillator is obtained by the connecting lead 121 which joins the control tube anode 109 and the lower end 123 of the oscillator tank circuit 21.

The operation of the controlled oscillator is as follows: The oscillator impresses a radio frequency potential on the pickup coil 27. If this potential exceeds the biasing potential between the anode 35 and cathode 41 of the rectifier tube 37, pulsating currents will flow in the load resistor 47. These rectified pulsating currents produce voltages which are filtered and impressed on the grid 57 of the d—c amplifier 59.

The voltage applied to the d—c amplifier grid is negative. This negative voltage on the grid reduces the anode current flowing through the anode resistor 84 on positive cycles of applied anode potential. The voltage developed across the anode resistor 84 is filtered by the filter network 85. The potential between the output of the filter network and ground opposes the biasing battery 97, and this voltage increases with decreasing anode current. As the opposing voltage increases, the negative potential applied to the grid 101 of the control tube 95 decreases.

The decrease in bias on the grid of the control tube 95 increases the anode current flowing through the anode resistor 111. As more current flows the potential on the anode 109 decreases. The anode current for the oscillator 1 is applied from this anode 109. Therefore, the potential applied to the oscillator anode decreases when the oscillator output voltage exceeds the bias on the rectifier, and thus decreases the output voltage. The converse is likewise true. In this manner the oscillator output voltage is held within very narrow limits of fluctuation.

The range of control is largely dependent on very high voltage amplification in the direct current amplifier and the operating characteristics of the control tube. I have found that a voltage gain of the order of four or five hundred is sufficient for practical operation. The variation of radio frequency output voltage may be the result of the variation of the oscillator with frequency or it may be due to variation of applied potentials. In either case the control tube operates to automatically compensate for the change in output voltages.

Since the control tube is also operated from the variable power source, it will not be perfect over an unlimited range for compensating such variation. However, within the usual operating range of commercial alternating current supply circuits, the compensating control will operate to maintain substantially constant output voltages. The operating characteristics of the circuits are represented in Fig. 2. The graph A represents output voltage plotted against frequency with control. Graph B represents the same oscillator output voltages plotted against frequency without control.

The curves C and D represent respectively the variation of output voltage plotted against the input alternating voltage with and without the compensating control. The output potentials across the pickup coil may be readily determined by the current flowing through the load resistor 49 in the second of the diode rectifier elements 39—41. The microammeter 51 may be calibrated to indicate directly in volts.

The radio frequency output voltage is maintained substantially constant, and independent of changes in frequency or normal variations in the alternating current supply circuit. The rectified voltages are likewise substantially constant and may be employed for biasing or the like. An oscillator of the type described is useful in radio frequency measurements, signal generators, and similar instruments, or may also be applied to audio frequency devices.

I claim:

1. In a thermionic oscillator including an anode circuit, means for supplying a controlled anode potential to said anode circuit, means for deriving a biasing potential from said oscillator, means for amplifying about one hundred times said biasing potential, means for energizing said bias amplifying means by alternating current, a control tube including a grid circuit and an anode circuit, means for applying said amplified biasing potential to said grid circuit so that the anode potential of said control tube varies inversely with the output voltage of said oscillator, and a connection for supplying said controlled anode potential to said oscillator from the anode circuit of said control tube.

2. In a thermionic oscillator including an anode circuit, means for controlling the output of said oscillator including a controlled anode potential for said anode circuit, means for establishing a desired voltage output level for said oscillator and means for compensating for variations in said level including in the order named means for deriving a biasing potential from said oscillator, means for amplifying several hundred times said biasing potential, an alternating current source for energizing said bias amplifying means, a control tube including a grid circuit and an anode circuit, means for applying said amplified biasing potential to said grid circuit so that the anode potential of said control tube varies inversely with the output voltage of said oscillator, and a connection for supplying said controlled anode potential to said oscillator from the anode circuit of said control tube.

3. In a device of the character described, an oscillator having an output circuit and a source of anode current including a series impedance, and means for compensating for variations of voltage across said output circuit including in the order named a rectifier for deriving a biasing potential from said oscillator output, amplifying means for increasing several hundred times said biasing potential, a source of alternating current for energizing said amplifying means, a control tube, connections from said control tube through said series impedance to said source, and means for applying said amplified biasing potential to said control tube so that the potential of said source of anode current including said series impedance is automatically varied inversely with the output of said oscillator.

4. In a device of the character described, an oscillator having an anode, an output circuit and a source of anode current for said anode derived from an alternating current supply, said source being subject to regulation and including a series impedance and means for compensating for variations of voltage across said output circuit including in the order named a rectifier for deriving a biasing potential from said oscillator output, amplifying means energized at least in part by said alternating current supply for increasing said biasing potential by the order of several hundred times, a control tube, connections from said control tube to said source of anode current and said series impedance, and means for applying said amplified biasing potential to said control tube so that the potential of said source of anode current and said series impedance is automatically varied inversely with the output of said oscillator and applied to said oscillator anode.

5. In a device of the character described, an oscillator having an output circuit and a source including a series resistance of anode current derived from a rectified and filtered alternating current, and means for compensating for variations of voltage across said output circuit including in the order named a rectifier for deriving a biasing potential from said oscillator output, amplifying means energized at least in part by said alternating current for increasing said biasing potential by a factor of at least one hundred times, a control tube, connections from said control tube to said source and said series resistance, means for applying said amplified biasing potential to said control tube so that the potential of said source and said series resistance is automatically varied inversely with the output of said oscillator, and means for applying said inversely varied potential to the output circuit of said oscillator.

6. In a device of the character described, an oscillator having an output circuit and a source of anode current, and means for compensating for variations of voltage across said output circuit including in the order named a rectifier for deriving a biasing potential from said oscillator output, an amplifier whose anode circuit includes a source of alternating current for increasing said biasing potential by the order of at least one hundred times, a control tube, connections from said control tube to said source of anode current, means for applying said amplified biasing potential to said control tube so that the potential of said source of anode current is automatically varied inversely with the output of said oscillator, and means for applying said inversely varied potential to the output circuit of said oscillator.

7. The method of controlling the output current of an oscillator by means of a control tube which comprises rectifying a portion of said current, amplifying said rectified current, applying said amplified rectified current to vary the impedance of said control tube and thus vary the potential of a source of anode current in inverse relation to the output current of said oscillator, and applying the thus varied current to the output circuit of said oscillator to thereby maintain a substantially constant output current from said oscillator.

CLYDE E. HALLMARK.